Oct. 27, 1953 J. TE WINKEL 2,657,282

NEGATIVE FEEDBACK AMPLIFIER CIRCUIT

Filed Dec. 22, 1950

INVENTOR.

JAN TE WINKEL

BY Fred M Vogel

AGENT

Patented Oct. 27, 1953 2,657,282

UNITED STATES PATENT OFFICE 2,657,282

NEGATIVE FEEDBACK AMPLIFIER CIRCUIT

Jan te Winkel, Eindhoven, Netherlands, assignor to Hartford National Bank and Trust Company, Hartford, Conn., as trustee Application December 22, 1950, Serial No. 202,299
In the Netherlands January 11, 1950

4 Claims. (Cl. 179—171)

The present invention relates to multi-stage amplifier circuit arrangements and more particularly to multi-stage amplifier circuit arrangements provided with current negative feedback.

In circuit arrangements of the above type, in order to reduce distortion, it is common practice to include a negative feedback impedance in the output circuit of the last tube of the amplifying circuit, across which is produced a negative feedback voltage. This negative feedback voltage is applied to the grid of the cathode circuit of a preceding tube. If this negative feedback impedance is included in the anode circuit of the said last tube, the difficulty arises that the load impedance or the output transformer, which are also included in the anode circuit of this tube, must be above ground potential. In other words, one end of the load impedance or transformer cannot be connected to ground potential. Such a circuit exhibits a tendency to self-oscillate at high values of the negative feedback, owing to the parasitic capacities of the load impedance or the output transformer with respect to ground.

For this reason, use is frequently made of a circuit arrangement in which the negative feedback impedance is included in the cathode circuit of the last amplifying tube. However, it has been found that in the resultant circuit arrangement insufficient reduction in distortion by means of negative feedback is achieved because the distortion is substantially completely determined by the value of the quotient of the mutual conductance divided by the parasitic grid cathode capacity of the final amplifying tube.

The principal object of the present invention is to provide an improved negative feedback amplifier circuit arrangement. More particularly, it is an object of the invention to provide a negative feedback amplifier circuit arrangement similar to that described above but wherein oscillation is prevented and wherein improved distortion reduction is achieved.

Further objects of the invention will appear from the following description:

According to the invention, a balanced bridge circuit arrangement is connected between the final amplifying tube and the immediately preceding amplifying tube, the bridge circuit comprising the anode impedance of this preceding amplifying tube to ground, an impedance which is common to the cathode circuits of the two tubes, an impedance in the cathode circuit of the final amplifying tube, which together with the impedance mentioned before constitutes the negative feedback impedance, and the impedance comprising the parasitic and interelectrode grid cathode capacities of the final tube between the free end of the aforesaid anode impedance of the preceding amplifying tube and the said impedance in the common cathode circuits of the two tubes.

It is known per se with a multitube amplifier having negatitve feedback, to connect a Wheatstone bridge circuit in the output circuit of the first or the output circuit of the last amplifying tube, for example, to render the negative feedback independent of variations of the output impedance of the amplifier. According to the invention, and in contradistinction to such an amplifying circuit arrangement, the Wheatstone bridge circuit is included between two amplifying tubes in order to obtain a very high degree of distortion reduction.

In order that the invention may be more clearly understood and readily carried into effect, it will now be described in detail with reference to the accompanying drawing in which.

Figure 1:
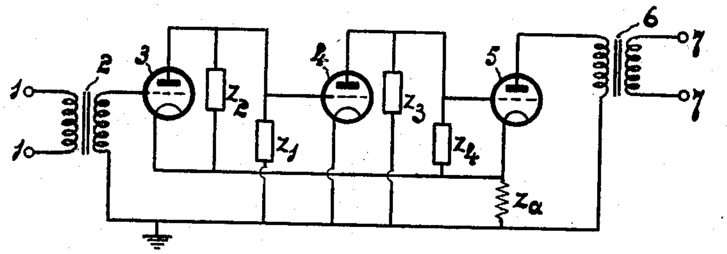
Fig. 1 shows a known circuit arrangement.

In the circuit arrangement shown in Fig. 1 a voltage to be amplified is supplied through input terminals 1 and an input transformer 2 to the cascade circuit of amplifying tubes 3, 4 and 5, having input and output impedances $Z_1$, $Z_2$, $Z_3$ and $Z_4$. To simplify the circuit arrangement, the supply voltage sources have been omitted. The amplified voltage is supplied to an output transformer 6 having output terminals 7. Across an impedance $Z_a$ in the cathode circuit of the final amplifying tube 5 is produced a voltage which is fed to the cathode circuit of the first amplifying tube 3, with the result that a negative feedback is developed which ensures that the current through the output transformer 6 is relatively free of distortion with respect to the input voltage across the terminals 1.

The invention is based on recognition of the fact that the distortion of the amplifier cannot sufficiently be reduced by means of negative feedback alone, since the current passing through the impedance $Z_a$ in the cathode circuit of the tube 5, across which the negative feedback voltage is produced is not exactly equal to the current passing through the output transformer 6. An additional current passes through the impedance $Z_a$, this additional current being derived from the current passing through the impedance $Z_4$, said impedance never being infinite in value owing to the presence of the parasitic and interelectrode grid cathode capacities of the tube 5. Consequently, the distortion is found to be reducible by not more than a factor $$\frac{1}{1+sZ4}$$

where $s$ represents the mutual conductance of the tube 5.

Figure 2:
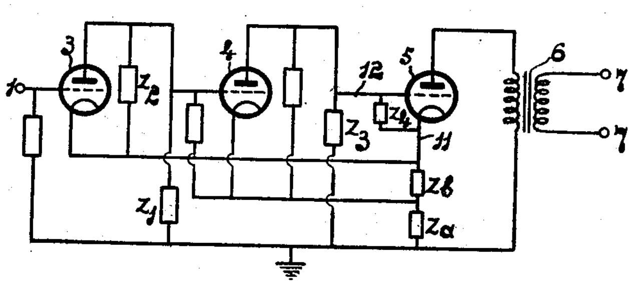
Fig. 2 shows a modification of this circuit arrangement embodying the features of the invention.

The circuit arrangement shown in Fig. 2, in which the arrangement according to the invention is embodied, is distinguished from that shown in Fig. 1 in that the cathode impedance of the tube 5, across which the negative feedback voltage is produced is constituted by the series combination of two impedances $Z_a$ and $Z_b$, which together with the impedances $Z_3$ and $Z_4$ constitute a capacitively balanced bridge circuit connected between the tube 5 and the immediately preceding tube 4. In other words, between the impedances $Z_a$, $Z_b$, $Z_3$ and $Z_4$ the relationship $Z_a.Z_4=Z_b.Z_3$ is fulfilled. Consequently, the current which, via the impedance $Z_4$, flows through the part $Z_b$ of the negative feedback impedance $Z_a—Z_b$, will be compensated by the current which, through impedance $Z_3$, is fed to the part $Z_a$ of the negative feed-back impedance $Z_a—Z_b$. Consequently, the voltage across the negative feedback impedance $Z_a—Z_b$ will vary only with the current passing through the tube 5.

Any impedances included in the conductors 11 and 12 have to be taken into account in determining the value of the impedance $Z_4$ for the adjustment of the bridge equilibrium.

It is advantageous that the impedances $Z_1$ and $Z_2$ in the output circuit of the amplifying tube 3 should also fulfill the bridge relationship: $Z_a.Z_2=Z_b.Z_1$; since in this case both the retroaction between the amplifying tubes 3 and 4 and that between the tubes 4 and 5 will be avoided and only negative feedbacks between the last amplifying tube 5 and the first amplifying tube 3 and also the individual negative feedbacks of the tubes 3 and 5 will be effective.

While the invention has been described in a particular use thereof and in a particular embodiment, it is not desired that it be limited thereto for obvious modifications thereof will occur to those skilled in the art without departing from the spirit and scope of the invention.

What I claim is:

1. A multi-stage amplifier comprising an amplifying stage, a succeeding amplifying apparatus and means wherein an incoming signal is supplied to the input of said amplifying stage, said apparatus including first and second electron discharge tubes, each tube having a cathode, an anode and a control grid, the anode of said first tube and the control grid of said second tube being intercoupled, a first impedance coupled between the anode of said first tube and a point of ground potential, second and third impedances connected in series to form a series circuit, said series circuit being coupled between the cathode of said second tube and said ground point, means coupling the cathode of said first tube to the junction point of said second and third impedances whereby said third impedance is coupled to the cathodes of both tubes, the grid to cathode impedance of said second tube constituting a fourth impedance whereby said first and fourth impedances form one branch of a Wheatstone bridge and said series circuit forms the other and parallel branch of said bridge, said impedances having values relative to each other at which said bridge is substantially balanced, means to supply the signal appearing in the output of the amplifying stage to the grid of said first tube to produce a negative feedback current flow through said series circuit, and means coupled to said series circuit to supply said negative feedback current to said amplifying stage to reduce distortion therein.

2. A multi-stage amplifier as set forth in claim 1 wherein the impedances of said amplifying apparatus satisfy the mathematical relation $$(Z_a)(Z_4)(=Z_b)(Z_3)$$

where $Z_3$=the first impedance
$Z_b$=the second impedance
$Z_a$=the third impedance
$Z_4$=the fourth impedance 3. A multi-stage amplifier responsive to an incoming signal and comprising first, second and third electron discharge tubes, each tube having a cathode, an anode and a control grid, the anodes of said first and second tubes being respectively intercoupled with the control grids of said second and third tubes, first and second impedances respectively coupled between the anodes of said first and second tubes and a point of ground potential, a third impedance coupled between the anode and cathode of said first tube, fourth and fifth impedances connected in series to form a series circuit, said series circuit being coupled between the cathode of said third tube and said ground point, means coupling the cathode of said second tube to the junction point of said fourth and fifth impedances whereby said fifth impedance is coupled to the cathodes of said second and third tubes, the grid to cathode impedance of said third tube constituting a sixth impedance whereby said second and sixth impedances form one branch of a first Wheatstone bridge and said series circuit forms the other and parallel branch of said first bridge and also forms one branch of a second Wheatstone bridge, the other and parallel branch of said second bridge being formed by said first and third impedances, the impedances included in each bridge having values relative to each other at which both bridges are substantially balanced, means to apply said signal to the control grid of said first tube to produce a negative feedback current flow through said series circuit, and means interconnecting the cathodes of said first and third tubes to supply said negative feedback current to said first tube whereby the internal distortion of said amplifier is reduced.

4. A multi-stage amplifier as set forth in claim 3 wherein the impedances constituting said first and second Wheatstone bridges satisfy the mathematical relations $$(Z_a)(Z_4)=(Z_b)(Z_3)$$
$$(Z_a)(Z_2)=(Z_b)(Z_1)$$

where $Z_1$=the first impedance
$Z_2$=the third impedance
$Z_3$=the second impedance
$Z_b$=the fourth impedance
$Z_a$=the fifth impedance
$Z_6$=the sixth impedance

JAN TE WINKEL.

References Cited in the file of this patent

UNITED STATES PATENTS

| Number | Name | Date |
|---|---|---|
| 2,196,844 | West | Apr. 9, 1940 |
| 2,224,699 | Rust | Dec. 10, 1940 |
| 2,227,048 | West | Dec. 31, 1940 |
| 2,337,423 | Stillwell | Dec. 21, 1943 |
| 2,490,805 | Hastings | Dec. 13, 1949 |